United States Patent
Mangat et al.

(10) Patent No.: US 8,706,540 B2
(45) Date of Patent: Apr. 22, 2014

(54) TASK MANAGEMENT IN A WORKFORCE ENVIRONMENT USING AN ACOUSTIC MAP CONSTRUCTED FROM AGGREGATED AUDIO

(75) Inventors: Pawitter Mangat, Gilbert, AZ (US); Timothy J. Collins, Homer Glen, IL (US); Young S. Lee, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 550 days.

(21) Appl. No.: 12/962,782

(22) Filed: Dec. 8, 2010

(65) Prior Publication Data

US 2012/0150578 A1 Jun. 14, 2012

(51) Int. Cl.
*G06Q 10/00* (2012.01)

(52) U.S. Cl.
USPC ........................................... 705/7.13

(58) Field of Classification Search
USPC .......................................... 705/7.13; 367/118
See application file for complete search history.

(56) References Cited

U.S. PATENT DOCUMENTS

| | | | |
|---|---|---|---|
| 6,233,462 B1 | 5/2001 | Kanai | |
| 6,988,068 B2 | 1/2006 | Fado et al. | |
| 7,138,914 B2 * | 11/2006 | Culpepper et al. | 340/539.13 |
| 7,203,458 B1 * | 4/2007 | Cheng | 455/67.11 |
| 7,209,955 B1 | 4/2007 | Major et al. | |
| 7,359,938 B1 | 4/2008 | Davies et al. | |
| 7,483,917 B2 * | 1/2009 | Sullivan et al. | 1/1 |
| 7,496,510 B2 * | 2/2009 | Frank et al. | 704/246 |
| 7,590,538 B2 * | 9/2009 | St. John | 704/246 |
| 7,962,544 B2 * | 6/2011 | Torok et al. | 709/200 |
| 8,224,355 B2 * | 7/2012 | Beydler et al. | 455/457 |
| 8,255,261 B2 * | 8/2012 | Magerkurth et al. | 705/7.25 |
| 2002/0165731 A1 * | 11/2002 | Dempsey | 705/1 |
| 2003/0222792 A1 * | 12/2003 | Berman et al. | 340/932.2 |
| 2004/0193422 A1 | 9/2004 | Fado et al. | |
| 2006/0256937 A1 * | 11/2006 | Foreman et al. | 379/88.08 |
| 2007/0027806 A1 * | 2/2007 | Sands et al. | 705/42 |
| 2007/0132597 A1 * | 6/2007 | Rodgers | 340/573.1 |
| 2007/0133351 A1 * | 6/2007 | Taylor | 367/118 |
| 2007/0190944 A1 * | 8/2007 | Doan et al. | 455/63.1 |
| 2007/0238085 A1 * | 10/2007 | Colvin et al. | 434/365 |
| 2008/0181507 A1 * | 7/2008 | Gope et al. | 382/190 |
| 2010/0322035 A1 * | 12/2010 | Rhoads et al. | 367/118 |

FOREIGN PATENT DOCUMENTS

WO 2009012496 A2 1/2009

* cited by examiner

*Primary Examiner* — Jonathan G Sterrett
*Assistant Examiner* — Folashade Anderson
(74) *Attorney, Agent, or Firm* — Barbara R. Doutre (57) ABSTRACT

Incoming audio from mobile devices can be centrally processed, where a server can filter background noise in real time, such as by using an XOR function. Instead of discarding the filtered noise, however, it can be processed in parallel to dynamically construct an acoustic map of the environment. The acoustic map can be generated from an aggregation of sound data from multiple devices positioned in a geographic environment. The acoustic map can be linked to a configurable set of rules, conditions, and events, which can cause dynamic adjustments to be made to a workforce task management system. For example, employee availability can be assessed using the acoustic map and workforce tasks can be assigned based in part upon this availability.

20 Claims, 4 Drawing Sheets

TASK MANAGEMENT IN A WORKFORCE ENVIRONMENT USING AN ACOUSTIC MAP CONSTRUCTED FROM AGGREGATED AUDIO

BACKGROUND

The present invention relates to the field of workforce communications and task management, and, more particularly, to task management in a workforce environment using an acoustic map constructed from aggregated audio.

In a typical workforce environment, communications among employees can occur through a wide range of methods, such as speakers over the facility, individual hand held devices, personal communications, mobile phones, and other mobile communication devices. The workforce environment is often noisy, which has caused noise reduction circuitry to be added to the devices in many instances. Adding processing capabilities, circuitry, and algorithms for noise reduction can result in a cost-per-device that is exorbitantly high for many circumstances. Further, removing ambient noise at the device level represents a lost opportunity for capturing information that is potentially useful.

BRIEF SUMMARY

One aspect of the disclosure can include a method, computer program product, system, and apparatus for monitoring and managing a workforce in a geographic region. In the aspect, audio can be gathered from a set of different communication devices deployed throughout a geographic region within which a workforce performs a function. The different communication devices can include wireless devices for voice communications. The workforce can include a set of employees that work within the geographic region and that utilize the different communication devices to communicate with each other. The audio can be aggregated from the set of different communication devices to create an acoustic map of the geographic region comprising geographically plotted sound generating objects. Sound generated from the sound generated objects can be processed to determine a workforce relative event, which is tracked by a task management system used by the workforce. A selection from among a set of different employees positioned in the geographic region can occur. The selection can be based upon the workforce relative event determined from the at least one sound object. At least one real time task can be assigned to the selected one of the different employees. The assigned task can be communicated to the selected employee via one of the different communication devices proximate to the selected employee.

Another aspect of the disclosure is for a system for monitoring and managing a workforce in a geographic region. The system can include a communication component, a mapping component, and a task management component. The communication component can permit bidirectional voice communications between a plurality of employees that work within a geographic region and that utilize different communication devices to communicate with each other. The mapping component can aggregate audio from the different communication devices to create an acoustic map of the geographic region comprising geographically plotted sound generating objects. The task management component can assign tasks to selected ones of a set of different employees positioned in the geographic region, wherein the selection is based upon a workforce relative event determined from sound generating objects. The communication component can be used to communicate the assigned tasks to the selected ones of the different employees.

DETAILED DESCRIPTION

The disclosed solution addresses a need to improve sound quality at a workforce device level, while concurrently leveraging information from background sounds for real-time task management and monitoring purposes. Real-time, as used herein, is intended to include near-real time performance. That is, the disclosure acknowledges some processing delays are existent, which nevertheless are low enough to permit reactive taskings for a workforce environment. In the disclosure, incoming audio from mobile devices can be centrally processed, where a server can filter background noise in real time, such as by using an XOR function. Instead of discarding the filtered noise, however, it can be processed in parallel to dynamically construct an acoustic map of the environment. That is, the acoustic map can be generated from an aggregation of sound data from multiple devices positioned in a geographic environment. The acoustic map can be linked to a configurable set of rules, conditions, and events, which can cause dynamic adjustments to be made to a workforce's task management system. For example, employee availability can be assessed using the acoustic map and workforce tasks can be assigned based in part upon this availability.

In one contemplated embodiment, the acoustic map and input used to construct it can be integrated into a predictive model, thereby enables workforce capacity predictions for the future based on historic data and discovered patterns. Predictions of the predictive can be made at a number of different granularities, to predict expected workforce needs on a workshift basis, a weekly basis, a monthly basis, a seasonal basis, and/or a yearly basis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
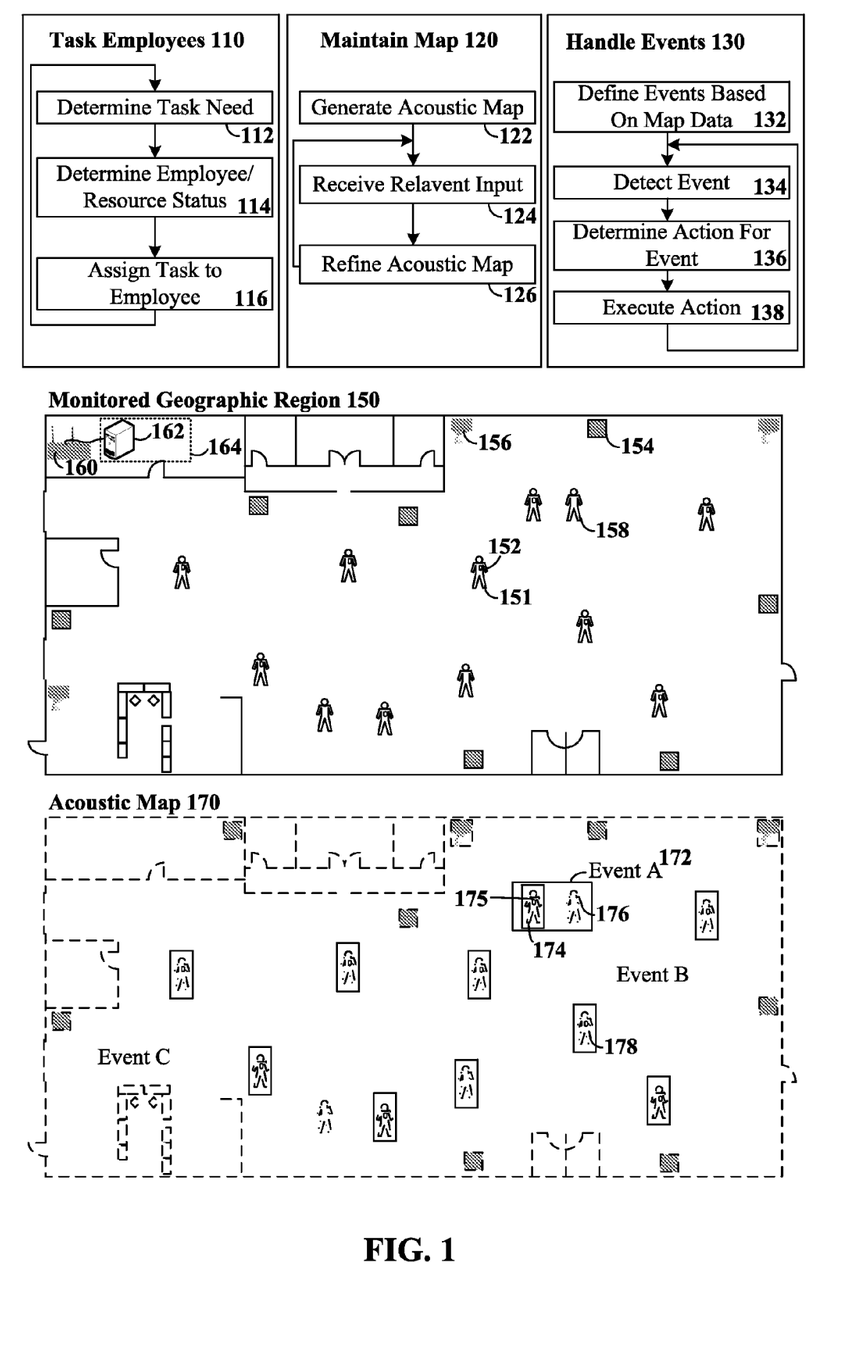
FIG. 1 provides a set of diagrams for an acoustic map for a monitored geographic region in accordance with an embodiment of the disclosure.

FIG. 1 provides a set of diagrams for an acoustic map 170 of a monitored geographic region 150 in accordance with an embodiment of the disclosure. In the figure, a monitored geographic region 150 can include a workforce (employee 151, 158, 174) and a set of communication devices 152, 154, 156 for communicating. The communication devices can include a wide range of devices, such as intercom speakers 154, individual hand held devices, personal communications, mobile phones, two-way video communications, and the like. These communication devices 152, 154, 156 can utilize any of a variety of technologies, such as two-way radio, mobile telephony, wired telephony, wired networks (Ethernet, token ring, Fiber Distributed Data Interface (FDDI), etc.), wireless networking (WIFI, WIMAX, etc.), wireless point-to-point communications (BLUETOOTH, ZIGBEE, WIRELESS USB, etc.), and the like.

At least a portion of the communication devices 152, 154, 156 can have their communications routed through a centralized access point 160. This access point 160 can communicate with processing system 162, which is part of environment control system 164. The processing system 162 can perform digital signaling processing (DSP) functions for communications that is routes. In one embodiment, the DSP functions of system 162 can be used to improve clarity of the communications, such as by filtering out ambient noise from audio. Moreover, the system 162 can process the background sounds of the region 150 to determine conditions of the region 150. The audio inputs from the various computing devices 152, 154, 156 can be used to create an acoustic map 170 of the region 150. The acoustic map 170 can be an actual map, or can be any data structure comprising data that relates sound generating objects to their geographic position within the region 150. The acoustic map 170 can be dynamically updated and maintained (represented by section 120), can be used to trigger events and to take responsive actions (represented by section 130), and/or can be used to dynamically assign tasks to employees (represented by section 110).

To elaborate, employees 151 in a monitored geographic region 150 can be selectively tasked by a task management system, which is communicatively linked to the environment control system 164. The tasks can be based, at least in part, on information maintained in an acoustic map 170. Additionally, a set of events 172 can be detected based on acoustic map 170 information, which cause a set of responsive actions 138 to occur. The acoustic map 170 can be used to establish and/or to supplement a dynamically reactive environment (e.g., a smart environment).

The employees 151 present in the monitored geographic region 150 can be given tasks, as indicated by diagram section 110. That is, a task management system or server can determine a need for one or more tasks, as shown by block 112. Availability Of a set of employees 151 or other resources assignable to complete the task can be determined, as shown by block 114. The employee/resource can be assigned to the task, as shown by block 116.

In one embodiment, interactions and/or events 172 detected in the acoustic map 170 can be considered when determining employee availability for the new task (e.g., block 114). For example, if one employee (e.g., employee 174) is talking to a customer 176, as determined by Event A of map 170, a different employee 178 who is not talking to the customer 176 can be assigned (e.g., block 116) the task. Alternatively, if a task assignment function chooses to assign a task to an employee 174 engaged in a business related conversation, the employee 174 can be sent a text message (to device 175 carried by employee 174) instead of being sent an acoustic message (via device 175) so as to be minimally intrusive to the conversation.

The acoustic map 170 can be constantly updated, as illustrated by diagram section 120. That is, the acoustic map can be generated initially, as shown by block 122. Generation of the acoustic map can occur by aggregating acoustic data gathered from a set of devices capable of receiving acoustic input (e.g., device 175, device 156, device 154) that are positioned about the monitored geographic region 150. These devices can include relatively stationary ones (e.g., device 154) having a known location, as well as mobile ones. Even after the acoustic map 170 has been initially generated, input can be continuously received, as shown by block 124. This input can be used to refine the acoustic map 126, which can occur dynamically and, in one embodiment, can occur in real-time.

As used herein, real-time includes near-real time processing, and other processing operations which are subject to appreciable processing delays. That is, real-time can refer to a set of hardware and software systems that are able to work within operational deadlines having temporal constraints significant to a specific context within which they are performed. For example, in system 100 real-time assignment of an employee to a task, such as assisting a customer, can occur within temporal boundaries based on the task context for the workforce environment. As such, a delay of a few seconds in determining a most suitable employee to assist the customer is still considered real-time or near-real time, as used herein. Thus, real-time should be considered a time-based constraint relative to an operation being performed by the system, which will vary depending on operation specifics.

One or more events 172 can be ascertained for the acoustic map 170, which can be referred to as workplace relevant events in diagram section 130. In other words, rules and conditions can be established that define a set of events being watched, where these events can utilize map 170 data and/or be represented within the acoustic map 170. More specifically, a set of events can be defined that are based on map data, as shown by block 132. These events can be listened for and detected, as shown by block 134. In block 136, an action to be taken responsive to the event can be determined. This action can then execute, as shown by block 138.

Figure 2:
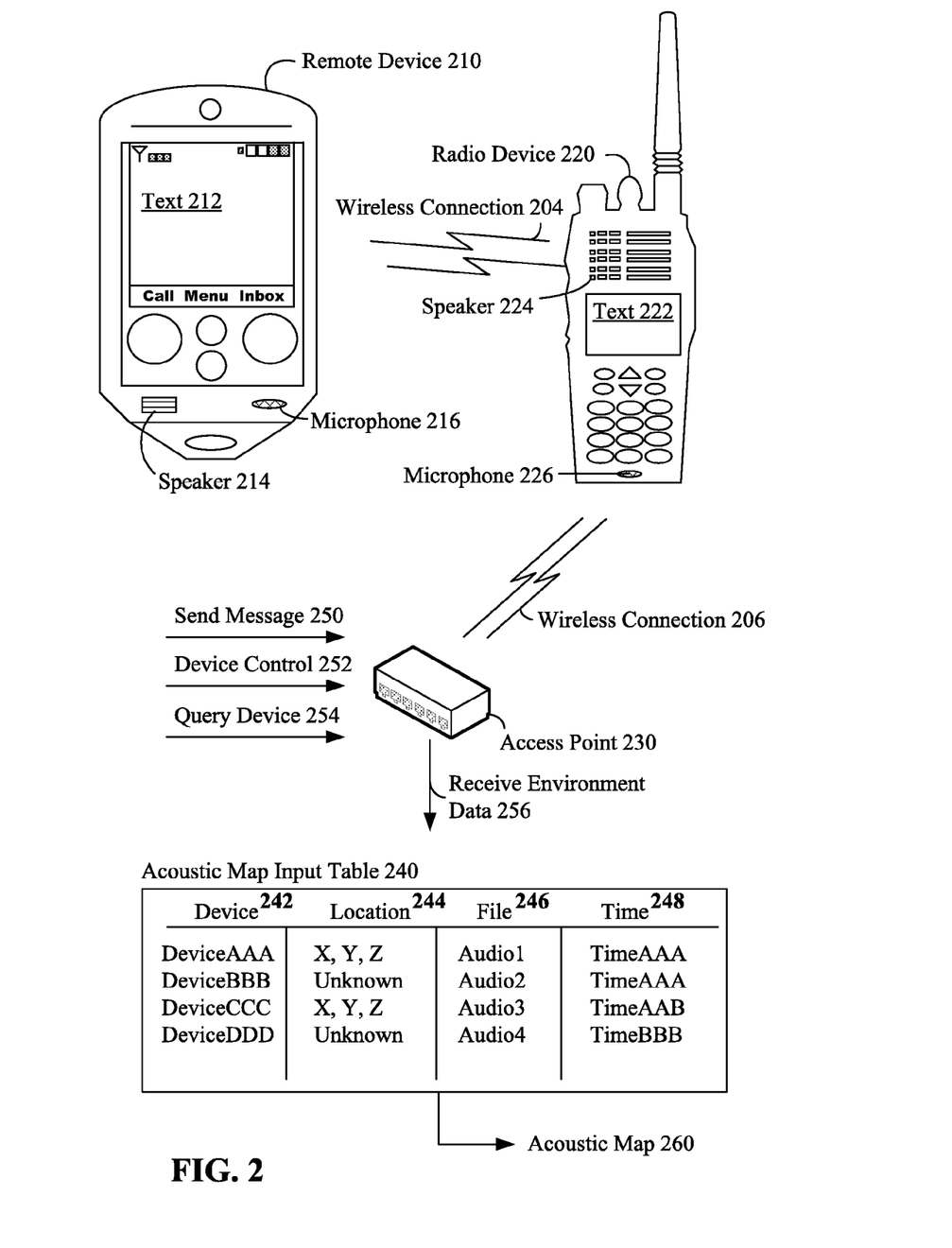
FIG. 2 illustrates a communication device including a microphone able to provide input for constructing an acoustic map in accordance with an embodiment of the disclosure.

FIG. 2 illustrates a communication device 210, 220 including a microphone able to provide input for constructing an acoustic map in accordance with an embodiment of the disclosure. The devices 210, 220 represent one possible type of device (152, 154, 158) that can be carried by an employee (or customer) in the monitored geographic region 150.

Each communication device 210, 220 can include a speaker 214, 224 and a microphone 216, 226. Other interactive modes can also exist for the communication devices 210, 220, such as a text 212, 222 mode, a video conferencing mode, a co-browsing mode, and the like. Specific devices shown in FIG. 2 include a remote device 210 and a radio device. It should be understood that other communication devices, such as an intercom, a mobile phone, a media tablet, a computer, and the like are contemplated.

The remote device 210 can communicate with a proximate main device (e.g., device 220), through a first connection 204 (e.g., BLUETOOTH), which relays the communications over a second connection 206 (e.g., WIFI, 3G, etc.) to an access point 230 (which can correspond to access point 160 of FIG. 1). Device 220 can be a machine that interfaces directly with a user and communicates directly with the access point 230. Connections 204 and 206 can be wireless or wired.

A number of different types of messages 250-254 can be conveyed to the devices 210, 220. One type of message is an output message 250, which is to be presented upon the device 210, 220 to a user. An output message 250 can include audio content, text, graphic content, video content, and the like. A device control 252 message can be used to remotely alter a function of the device 210, 220 to which the message 252 is directed. A control message 252 can, for example, turn a microphone 216, 226 on or off, can turn a camera on/off, can adjust a volume of the speaker 214, 224, can cause the device 210, 220 to vibrate, can adjust microphone 216, 226 sensitivity, and other such functions. A query device message 254 can query the device 210, 220 for internal information, which may include a device location for GPS equipped devices.

Environmental data 256 can be sent from the device 210, 220 through the access point 230 to a control system. The environmental data can include audio captured by the microphone 216, 226, video captured from a camera on the device 210, 220, text input via a device keypad, and the like. The environmental data 256 can be inserted into a repository, such as a repository containing acoustic map input table 240. This table 240 is shown for exemplary purposes only and is not to be construed as a limitation of the disclosure in regards to either format or content.

Table 240 can maintain records for each environmental datum point. Each record can specify which device 242 (e.g., device 210, 220) the environmental data 256 was obtained from, a location 244 of the device, a file 246 or other data structure containing content, and a time 248 at which the content was acquired. Information recorded within the input table 240 can be processed to generate (or update) an acoustic map 260 (which can correspond to acoustic map 170).

Figure 3:
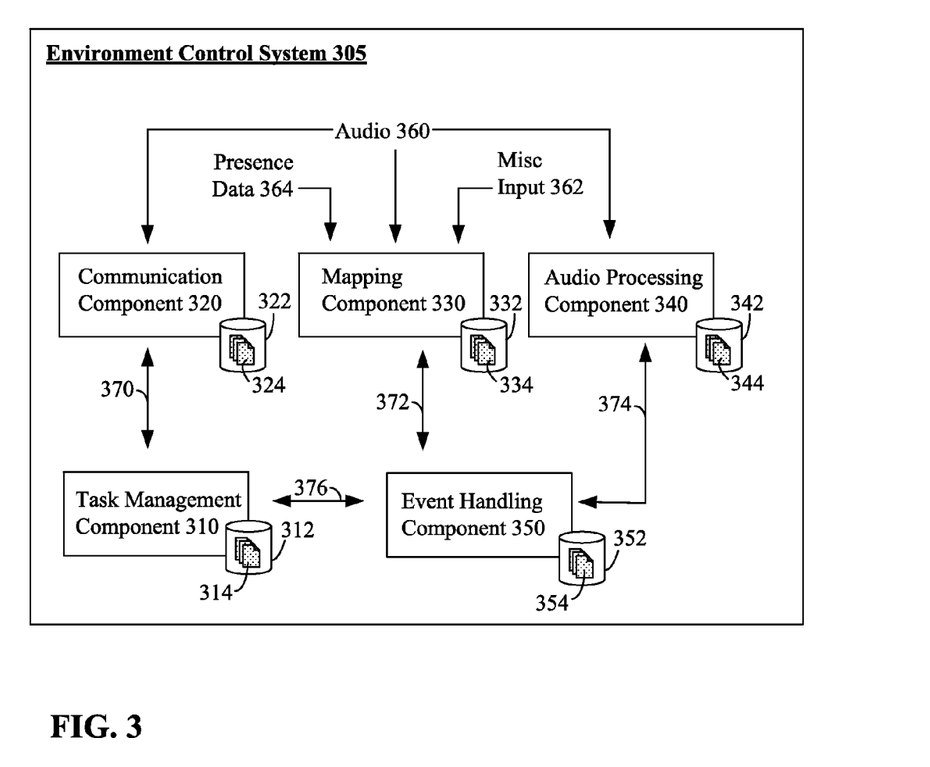
FIG. 3 shows an environment control system for monitoring a geographic region for constructing an acoustic map and for tasking a workforce in accordance with an embodiment of the disclosure.

FIG. 3 shows an environment control system 305 for monitoring a geographic region (e.g., region 150) for constructing an acoustic map, and for tasking a workforce in accordance with an embodiment of the disclosure. In one embodiment, the environment control system 305 can cooperatively interact with the devices 210, 220 and access point 230 of FIG. 2. The environment control system 305 can represent one embodiment for implementing the system 164 of FIG. 1.

In the environment control system 305, a set of functionally represented components 310, 320, 330, 340, 350 is shown. The components 310, 320, 330, 340, 350 can each be realized using a set of one or more computer program products that are digitally encoded on a physical storage medium. The computer program products can execute upon hardware that includes a processor. The hardware can include a set of one or more physical computing devices. Although shown separately, functions of the components 310, 320, 330, 340, 350 can be integrated together in one contemplated embodiment. Each of the communication components can be associated data store 314, 324, 334, 344, 354 within which documents and other information 312, 322, 332, 342, 352 can be stored.

Audio 360 received from a set of devices distributed throughout a geographic region can be processed by the communication component 320, the mapping component 330, and/or the audio processing component 340. The mapping component 330 can optionally receive additional inputs, such as video input, picture input, input from sensors, etc. (collectively shown as miscellaneous input 362), as well as presence data 364. Further, each of the components 310, 320, 330, 340, 350 can exchange data 370, 372, 374, 376 with other ones of the components 310, 320, 330, 340, 350.

Thus, tasks managed by the task management component 310 can be linked to events of the event handling component 350 and can be dispatched to employees using the communication component 320. Audio of the communication component 320 can be processed by audio processing component 340 and used by mapping component 330. Conditions indicated by mapping component 330 and determined by audio processing component 340 can be used to trigger events of the event handling component 350. The responsive actions taken for events, as managed by the event handling component 350 can include actions to be taken by the task management component 310, the communication component 320, the mapping component 330, the audio processing component 340, and other components.

The task management component 310 can be responsible for assigning tasks to workforce personnel. These tasks can include real-time, near real-time, time sensitive, and time constrained tasks. A commercial task management component 310 can be used and integrated into the communication component 320 and/or mapping component 330 in one contemplated embodiment. The data 314 maintained by component 310 can include records that indicate which tasks are pending, assigned, unassigned, completed, and the like. The records maintained in data 314 can also indicate workforce availability, employee location, and the like. In one embodiment, the task management component 310 can assign tasks based, at least in part, upon sensed actions occurring in the proximity of a set of employees, which are based on the audio 360 input and its processed results.

The communication component 320 can be a component through which all communications to and from the communication devices (e.g., device 152, 154, 175 and/or devices 210, 220) is routed. For example, local two-way radio traffic can be routed through the communication component 320, which also includes an ability for the two-way radio devices to be selectively connected to outside lines. Thus, telephony calls, internet communications, and the like can be conveyed to the on-floor (within geographic region 150) devices.

In one embodiment, the communication component 320 can filter ambient sounds to provide clearer voice communications among the devices. This filtering can occur dynamically and in real-time or near real-time and can alleviate a need for sound filtering equipment to be included within the communication devices themselves. In one embodiment, the communication component 320 can also send various messages (e.g., messages 250-254) to the devices that it manages.

The mapping component 330 can utilize a set of different communication modalities in one embodiment, which includes real-time voice, video, images, text, and Web content. A most suitable modality for conveying messages to employees and/or customers in the geographic region (e.g., region 150) of the workforce can be determined by component 320 in one embodiment. Thus, when an employee is engaged in a conversation with a customer, a text message can be sent to task that employee instead of an audio one. The communication component 320 can maintain records (e.g., information 324) indicating which communication devices correspond to which people.

In one embodiment, a presence system can be integrated with (and or can communicate with) the communication component 320. In one embodiment, various ones of the communication devices (or other devices carried by an employee) can include a GPS receiver or other location determination mechanism, which can be used to track movement throughout the geographic region (e.g., region 150). In another embodiment, a location of the various employees (or other sound generation objects) can be determined by triangulation using a set of different sound receiving devices positioned in the geographic region. Additionally, in one embodiment, speaker identification and verification (SIV) technologies (of audio processing component 340) can be used to determine an identity of a person communicating through the communication component 320.

The mapping component 330 can plot a set of sound generating objects within a map of a geographic region. This map is referred to as an acoustic map (e.g., acoustic map 170) as it can be generated using acoustic input (e.g., audio 360). This audio 360 can be gathered from a set of devices distributed throughout a geographic region. The audio 360 can be aggregated to form a cohesive picture that is able to more accurately discern sound generating objects than would have been possible using any single device's input. In one embodiment, the acoustic map (e.g., map 170) can be aggregated with additional mapping data (e.g., input 362, 364), which increases the accuracy of the resulting map so that it is greater than possible from any single type of input. In one embodiment, a set of mapping rules 334 and conditions can be established so that the mapping component 330 is able to self-adjust to increase a quantity of input needed. For example, when additional audio 360 input is needed, the mapping component 330 can trigger the communication component 320 to turn on microphones of devices proximate to a region.

In one embodiment, a series of state (or time) specific maps can be recorded (in data 334). Each map can represent a snapshot of a state of the workforce environment in time. These snapshots can be combined to create a time picture spanning a duration. Pattern matching techniques can be used to "fill in" or infer details lacking in one snapshot of the workforce environment based on data contained in other snapshots of the map.

The audio processing component 340 can perform various digital signal processing functions for the audio 360. These include converting speech to text functions, text-to-speech functions, speaker identification and verification functions, noise filtering, object identification based on acoustic properties, object location based on sound paths, and the like. In one embodiment, a set of patterns and rules can be stored (information 344 of data store 342), which is used by audio processing component 340.

The event handling component 350 can establish conditions, rules, and actions (in information 354) for triggering and responding to events. These events include workforce relative events, which are events that relate to a set of employees positioned in a geographic region (e.g., region 150). Workforce relative events can be ones triggering an action of task management component 310 or can be events that cause a specific employee to be selected for a task by task management component 310. Workforce relative events can cause a creation of a new task, a modification of an existing task, or a termination of an unfulfilled task. A set of programmatic actions to be taken responsive to occurrences of events. The actions, events, and conditions of event handling component 350 can be fully configured by administrators and users of the environment control system 305.

It should be appreciated that the components 310, 320, 330, 340, 350 are presented to illustrate concepts expressed herein and are not intended to be a comprehensive enumeration of all possible components of environment control system 305. For example, in one contemplated embodiment, the environment control system can include a predictive component (not shown) and a pattern detection component (not shown).

The pattern detection component can determine patterns based on the audio 360 and other input 362, 364, to determine workforce significant trends and occurrences. For example, the pattern detection component can determine communication patterns (based on historical data in datastore 322), acoustic map patterns (based on data store 332 information), task assignment patterns (based on data store 312 information), and the like. A feedback loop can be established to refine patterns detected by and to improve recognition accuracy of the pattern detection component over time, with usage in a specific workforce environment.

Figure 4:
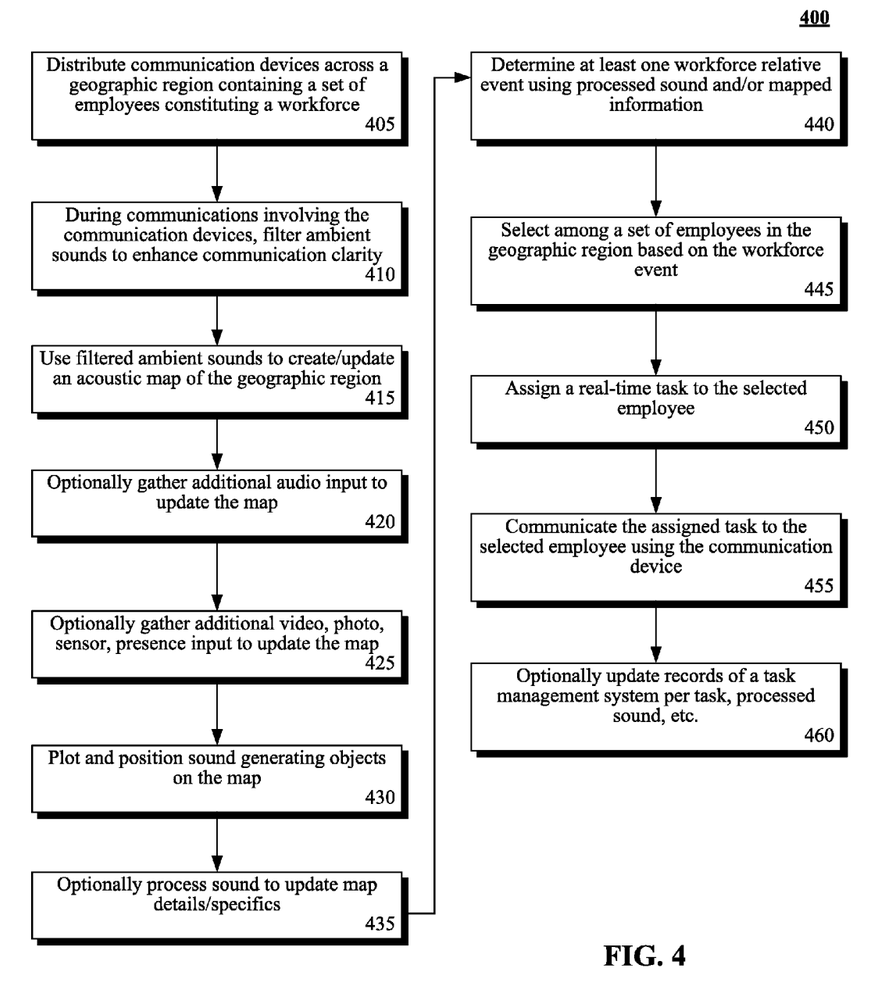
FIG. 4 is a flow chart of a method for monitoring a geographic region representing a workforce environment and for creating an acoustic map in accordance of an embodiment of the disclosure.

The predictive component can map patterns (such as patterns detected by pattern detection component) forward in time to predict optimal workforce size, composition, and skills needed at one or more future times. A predictive component can have variable and configurable time horizons, so that future predictions can be made on a strategic level (for upper management decisions) or tactical level (day-to-day management for lower management decisions) basis. Strategic level predictions can be on a seasonal or annual basis. Tactical level predictions can be forecast applicable to a shift, day, or week. FIG. 4 is a flow chart of a method 400 for monitoring a geographic region representing a workforce environment and for creating an acoustic map of the same in accordance of an embodiment of the disclosure.

Method 400 can begin in step 405, where a set of communication devices can be distributed across a geographic region containing the workforce. In one embodiment, the workforce environment can include not only a set of employees, but also customers that interact with the employees within the environment. In one embodiment, customers can interact with self-help, automated kiosks, and other such devices, which are collectively referred to as custom assist devices. Thus, one or more of the communication devices in the geographic region can be a customer-assist device. Regardless of the type of device involved in a communication, ambient sounds can be filtered from communications to increase clarity in step 410. This filtering can occur using a centralized processing server.

In step 415, the filtered ambient sound can be used to crate and/or update an acoustic map of the geographic region. In step 420, additional audio input can be optionally gathered to update the map. In one embodiment, an environmental control system can turn on microphones of devices deployed in the workforce environment to gather the additional audio input. In step 425, additional video, photo, and other sensor input can be gathered and used to update the map.

In step 430, positions of sound generating objects can be plotted on the map. In one embodiment, triangulation of sounds can be used to determine a position of the sound generating objects. In one embodiment, GPS and/or presence data can be used to aid in plotting the sound generating objects on the map. In step 435, sound can be optionally processed to update details and/or specifics of the objects. For example, sound patterns can be matched to characteristic sounds, such as glass breaking, hangers rustling, doors opening, and the like. Thus, the sounds can be matched to the objects that produce the sounds, which can be reflected on the map.

In step 440, at least one workforce relative event can be determined using the processed sound and/or the mapped information. For example, the sound of a spill, accident, and the like can automatically trigger an employee tasking to investigate and/or resolve the incident. In another example, a video can be presented proximate to an event of hangers rustling to show an employee how to hang the clothing (if detected after hours) or to provide additional information to a customer (if the sound occurs during open hours of a retail establishment).

In step 445, a selection among a set of employees can be made based on the workforce event. This selection can be for an employee that is to be tasked to respond to the workforce relative event in one embodiment. In step 450, a real-time (which includes near-real time, and any time horizon suitable in context to react to a time-sensitive event) task can be assigned to the selected employee. In step 455, the assigned task can be communicated to the selected employee using the communication device. Throughout this process, records of a task management system can be optionally updated appropriately, as shown by step 460. In one embodiment, the method 400 can be continuously (and asynchronously) performed dynamically in a time constrained manner to create a reactive and monitored workforce environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for monitoring and managing a workforce in a geographic region comprising:
   gathering audio from a plurality of different communication devices deployed throughout the geographic region within which a workforce performs a function, wherein the plurality of different communication devices comprise wireless devices for receiving and conveying sound, wherein said workforce comprises a plurality of employees that work within the geographic region and that utilize the different communication devices to communicate with each other;
   aggregating the audio from the plurality of different communication devices to create an acoustic map of the geographic region, wherein the acoustic map comprises data which relates sound generating objects to their positions in the geographic region;
   processing sound generated from at least one of the sound generating objects plotted on the acoustic map to determine a workforce relative event;
   selecting among a set of plurality of different employees positioned in the geographic region wherein the selection is based upon the workforce relative event determined from the at least one sound generating object;

assigning at least one task to a selected one of the different employees selected from the set of plurality of different employees;

communicating the assigned task to the selected one of the different employees via one of the different communication devices; and wherein at least one of the sound generating objects is not able to be accurately discerned from input from any single one of the plurality of different communication devices but that is able to be discerned by aggregating the audio from the plurality of different communication devices and triangulating positions of each of the sound generating objects within the geographic region from three or more of the plurality of different communication devices, each obtaining audio at approximately the same time, where the audio includes a sound generated by the each of the sound generating objects for which a position is being determined.

2. The method of claim 1, wherein the workforce relative event is one tracked by a task management system used by the workforce.

3. The method of claim 1, wherein the assigned task is a time constrained task that is to be reactively performed within the geographic region in direct response to the workforce relative event.

4. The method of claim 1, further comprising:
processing voice communications from a centralized processing system used by the plurality of the different communication devices to reduce ambient sounds also referred to as noise within the voice communications exchanged among the employees.

5. The method of claim 4, further comprising:
utilizing the ambient sounds filtered from the voice communications to determine the sound generating objects when aggregating the audio to create the acoustic map.

6. The method of claim 1, wherein at least one of the plurality of different communication devices are mobile two-way radio devices assigned to specific ones of the employees.

7. The method of claim 1, wherein the plurality of different communication devices comprise wire-line devices having a fixed position within the geographic region, wherein the fixed position is known and used as a positional reference point within the geographic region when aggregating audio from the plurality of different communication devices.

8. The method of claim 1, wherein the wire-line devices comprise intercom communication devices having a microphone and speaker.

9. The method of claim 1, wherein the communication device to which the assigned task is communicated is a multi-modal communication device having at least one silent communication mode and at least one audible communication mode, said method further comprising:
determining whether the assigned task is to be communicated using the silent communication mode or the audible communication mode based upon the workforce relative event; and
communicating the assigned task via the communication device using the determined communication mode.

10. The method of claim 1, wherein at least one of the sound generating objects is a human, wherein the audio comprises speech from the human, said method further comprising:
digitally processing the speech from the human utilizing a speaker identification and verification algorithm to determine an identity of the human, where the identity is otherwise unknown, wherein the workforce relative event is dependent upon the identity of the human as determined from the speaker identification and verification algorithm.

11. The method of claim 1, wherein the audio comprises speech from at least one of the set of plurality of different employees, said method comprising:
converting the speech to create text;
discerning meaning from the text;
selectively triggering an occurrence of a plurality of different workforce relative events depending on the discerned meaning; and
firing the real time event upon which the selection is based responsive to the occurrence.

12. The method of claim 1, further comprising:
establishing a plurality of configurable rules for the workforce, wherein each of the rules cause a workforce event to be fired when that rule is satisfied and wherein each of the rules has at least one conditional variable that must be true for the rule to be satisfied, wherein said conditional variable is derived from the gathered audio, wherein the workforce relative event is linked to one of the configurable rules.

13. The method of claim 1, wherein the workforce relative event indicates a potential for a commercial transaction with a customer in the geographic region, said method further comprising:
automatically conveying a communication to at least one of the different communication devices proximate to the workforce relative event as determined using the acoustic map, wherein the communication comprises at least one of a video and an audio message selected to facilitate the commercial transaction; and
presenting the communication to the customer upon the device.

14. The method of claim 1, wherein the workforce relative event indicates a potential problem existing within the geographic region, which one of the employees would be able to correct, wherein the assigned real time task is one believed to correct the potential problem.

15. The method of claim 1, further comprising:
determining a potential need to train an employee in a manner for performing the assigned task based on information contained in the acoustic map; and
conveying a training document comprising text or video to the selected communication device to assist the selected employee in performing the assigned task.

16. The method of claim 1 further comprising:
automatically turning on microphones of a subset of the plurality of different communication devices proximate to the portion to increase an amount of gathered audio; and
updating the acoustic map utilizing the increased amount of gathered audio to increase a resolution of the acoustic map in the portion.

17. A computer program product comprising a non-transitory computer readable storage medium having computer usable program code embodied therewith, the computer usable program code comprising:
computer usable program code which when executed by a processor is operable to gather audio from a plurality of different communication devices deployed throughout a the geographic region within which a workforce performs a function, wherein the plurality of different communication devices comprise wireless devices for receiving and conveying sound, wherein said workforce comprises a plurality of employees that work within the geographic region and that utilize the different communication devices to communicate with each other;

computer usable program code which when executed by a processor is operable to aggregate the audio from the plurality of different communication devices to create an acoustic map of the geographic region, wherein the acoustic map comprises data which relates sound generating objects to their positions in the geographic region;

computer usable program code which when executed by a processor is operable to process sound generated from at least one of the sound generating objects plotted on the acoustic map to determine a workforce relative event, which is tracked by a task management system used by the workforce;

computer usable program code which when executed by a processor is operable to select among a set of a plurality of different employees positioned in the geographic region wherein the selection is based upon the workforce relative event determined from the at least one of the sound generating objects;

computer usable program code which when executed by a processor is operable to assign at least one time constrained task to the a selected one of the different employees selected from the set of the plurality of different employees;

computer usable program code which when executed by a processor is operable to communicate the assigned task to the selected one of the different employees via one of the different communication devices proximate to the selected employee; and wherein at least one of the sound generating objects is not able to be accurately discerned from input from any single one of the plurality of different communication devices but that is able to be discerned by aggregating the audio from the plurality of different communication devices and triangulating positions of each of the sound generating objects within the geographic region from three or more of the plurality of different communication devices, each obtaining audio at approximately the same time, where the audio includes a sound generated by the each of the sound generating objects for which a position is being determined.

18. A system for monitoring and managing a workforce in a geographic region comprising:

a programmable data processing apparatus;

a communication component configured to permit bidirectional voice communications between a plurality of employees that work within the geographic region and that utilize different communication devices to communicate with each other when within the geographic region;

a mapping component configured to aggregate audio from the different communication devices to create an acoustic map of the geographic region, wherein the acoustic map comprises data which relates sound generating objects to their positions in the geographic region;

a task management component configured to assign tasks to a selected one of set of different employees positioned in the geographic region, wherein the selection is based upon a workforce relative event determined from the at least one sound generating objects, wherein the communication component is used to communicate the assigned tasks to the selected one of the set of different employees; and wherein at least one of the sound generating objects is not able to be accurately discerned from input from any single one of the plurality of different communication devices but that is able to be discerned by aggregating the audio from the plurality of different communication devices and triangulating positions of each of the sound generating objects within the geographic region from three or more of the plurality of different communication devices, each obtaining audio at approximately the same time, where the audio includes a sound generated by the each of the sound generating objects for which a position is being determined.

19. The system of claim 18, wherein the different communication devices comprise two-way radio devices having relatively short range communications, which permit communications across the geographic region, wherein the communication component filters interactive communications among the two-way radio devices to reduce ambient sounds also referred to as noise within voice communications exchanged among the employees.

20. The system of claim 18, further comprising:

an audio processing component configured to determine information about the sound generating objects by digitally processing the audio and utilizing speaker identification and verification techniques as well as matching patterns of sounds to correlate those sounds to specific objects to be found in the geographic region.

* * * * *